US009419866B2

(12) United States Patent
Wang et al.

(10) Patent No.: US 9,419,866 B2
(45) Date of Patent: Aug. 16, 2016

(54) METHOD, NODE, AND MONITORING CENTER DETECTING NETWORK FAULT

(71) Applicant: Huawei Technologies Co., Ltd., Shenzhen (CN)

(72) Inventors: Lelin Wang, Shenzhen (CN); Hongbo Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 392 days.

(21) Appl. No.: 14/079,860

(22) Filed: Nov. 14, 2013

(65) Prior Publication Data

US 2014/0122933 A1    May 1, 2014

Related U.S. Application Data

(63) Continuation of application No. PCT/CN2013/075616, filed on May 14, 2013.

(30) Foreign Application Priority Data

Nov. 1, 2012    (CN) .......................... 2012 1 0430708

(51) Int. Cl.
*G06F 11/00* (2006.01)
*H04L 12/24* (2006.01)
(Continued)

(52) U.S. Cl.
CPC .......... *H04L 41/5067* (2013.01); *G06F 11/079* (2013.01); *G06F 11/0709* (2013.01); *G06F 11/30* (2013.01); *H04L 43/0811* (2013.01)

(58) Field of Classification Search
CPC .... G06F 11/0709; G06F 11/079; G06F 11/30
See application file for complete search history.

(56) References Cited

U.S. PATENT DOCUMENTS

2006/0221942 A1    10/2006    Fruth et al.
2006/0252376 A1    11/2006    Fok et al.
(Continued)

FOREIGN PATENT DOCUMENTS

CN    101141768 A    3/2008
CN    102571421 A    7/2012
(Continued)

OTHER PUBLICATIONS

Foreign Communication From a Counterpart Application, PCT Application No. PCT/CN2013/075616, English Translation of Chinese Search Report dated Aug. 15, 2013, 3 pages.
(Continued)

*Primary Examiner* — Charles Ehne
(74) *Attorney, Agent, or Firm* — Conley Rose, P.C.; Grant Rodolph; Nicholas K. Beaulieu

(57) ABSTRACT

The present invention discloses a method, a node, and a monitoring center for detecting a network fault and relates to the field of network communications. The method includes: when a node receives a voice stream, receiving a source identifier, a codec type, and voice quality parameters; acquiring, according to the codec type and the voice quality parameters, a fault score corresponding to the node; and detecting, according to the fault score corresponding to the node, whether a network fault occurs on a network between the node and a source corresponding to the source identifier. The monitoring center includes: a first receiving module, a first acquiring module, and a first detecting module; and the node includes: a second acquiring module, a third acquiring module, and a second detecting module. In the present invention, a network fault that occurs on a network can be detected in time.

28 Claims, 6 Drawing Sheets

(51) Int. Cl.
*G06F 11/30* (2006.01)
*G06F 11/07* (2006.01)
*H04L 12/26* (2006.01)

(56) References Cited

U.S. PATENT DOCUMENTS

| | | | |
|---|---|---|---|
| 2008/0049634 A1* | 2/2008 | Goyal | H04L 12/2697 370/252 |
| 2008/0212567 A1 | 9/2008 | El-Hennawey et al. | |
| 2009/0113066 A1* | 4/2009 | Van Wie | H04L 12/1827 709/231 |
| 2009/0237240 A1 | 9/2009 | Leung et al. | |
| 2011/0107155 A1* | 5/2011 | Hirose | G06F 21/552 714/48 |
| 2012/0163214 A1 | 6/2012 | So et al. | |

FOREIGN PATENT DOCUMENTS

| | | |
|---|---|---|
| CN | 102710539 A | 10/2012 |
| CN | 102932181 A | 2/2013 |
| WO | 0180492 A2 | 10/2001 |

OTHER PUBLICATIONS

Foreign Communication From a Counterpart Application, PCT Application No. PCT/CN2013/075616, Chinese Written Opinion dated Aug. 15, 2013, 5 pages.
"Series P: Telephone Transmission Quality, Telephone Installations, Local Line Networks, Methods for Objective and Subjective Assessment of Quality, Perceptual Evaluation of Speech Quality (PESQ): An Objective Method for End-to-End Speech Quality Assessment of Narrow-Band Telephone Networks and Speech Codecs," ITU-T, p. 862, Feb. 2001, 30 pages.
Partial English Translation and Abstract of Chinese Patent Application No. CN102571421A, Apr. 28, 2014, 2 pages.
Foreign Communication From a Counterpart Application, European Application No. 13786143.1, Extended European Search Report dated Jul. 24, 2014, 11 pages.

* cited by examiner

METHOD, NODE, AND MONITORING CENTER DETECTING NETWORK FAULT

CROSS-REFERENCE TO RELATED APPLICATIONS

This application is a continuation of International Application No. PCT/CN2013/075616, filed on May 14, 2013, which claims priority to Chinese Patent Application No. 201210430708.1, filed on Nov. 1, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to the field of network communications, and in particular, to a method, a node, and a monitoring center for detecting a network fault.

BACKGROUND

With widespread applications of communications technologies, operators are increasingly concerned about perception and experience of end users. Each device vendor and operator attach great importance to an issue of how to ensure good voice call quality in a voice service. This requires network fault detection.

The prior art provides a method for detecting a network fault, and the method may be: using a specific test device to test a network after a user complains, where the test device includes a sending device and a receiving device; sending a voice sample test sequence to the network by using the sending device; receiving a degradation sequence corresponding to the voice sample test sequence from the network by using the receiving device; obtaining an information loss degree by comparing the voice sample test sequence with the received degradation sequence; acquiring a mean opinion score (MOS) score according to the obtained information loss degree; and determining, according to the MOS score, whether a network fault occurs on the network.

In a process of implementing the present invention, the inventor finds at least the following problem in the prior art:

In the prior art, whether a fault occurs on a network is detected only after a user complains; therefore, when a network fault occurs on the network, the network fault that occurs on the network cannot be detected in time.

SUMMARY

To detect a network fault on a network in time, the present invention provides a method, a node, and a monitoring center for detecting a network fault. The technical solutions are as follows:

According to a first aspect, a method for detecting a network fault where the method includes: when a node receives a voice stream, receiving a source identifier, a codec type, and voice quality parameters that correspond to the voice stream and are sent by the node; acquiring, according to the codec type and the voice quality parameters, a fault score corresponding to the node; and detecting, according to the fault score corresponding to the node, whether a network fault occurs on a network between the node and a source corresponding to the source identifier.

In a first possible implementation manner of the first aspect, the acquiring, according to the codec type and the voice quality parameters, a fault score corresponding to the node includes: acquiring a corresponding first baseline value according to the codec type; acquiring damage values corresponding to the voice quality parameters; and acquiring, according to the first baseline value and the damage values corresponding to the voice quality parameters, the fault score corresponding to the node.

In a second possible implementation manner of the first aspect, the acquiring a corresponding first baseline value according to the codec type includes: acquiring, according to the codec type, a corresponding bandwidth condition from a stored correspondence between the codec type and the bandwidth condition; and acquiring, according to the acquired bandwidth condition, the corresponding first baseline value from a stored correspondence between the bandwidth condition and the first baseline value.

In a third possible implementation manner of the first aspect, the acquiring damage values corresponding to the voice quality parameters includes: dividing the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; acquiring, according to the parameters of the first type and a stored correspondence between a parameter range and a damage value, the damage values corresponding to the parameters of the first type; and acquiring, according to specific values of the parameters of the second type, the damage values corresponding to the parameters of the second type.

In a fourth possible implementation manner of the first aspect, the acquiring, according to the first baseline value and the damage values corresponding to the voice quality parameters, the fault score corresponding to the node includes: calculating a sum of the damage values corresponding to the voice quality parameters; calculating a difference between the first baseline value and the sum of the damage values corresponding to the voice quality parameters, and determining the calculated difference as a second baseline value; and acquiring, according to the second baseline value and by using a mapping formula, the fault score corresponding to the node.

In a fifth possible implementation manner of the first aspect, the determining, according to the fault score corresponding to the node, whether a network fault occurs on a network between the node and a source corresponding to the source identifier includes: if the fault score corresponding to the node is less than a preset score threshold, determining that no network fault occurs on the network between the node and the source corresponding to the source identifier; and if the fault score corresponding to the node is greater than or equal to the preset score threshold, determining that a network fault occurs on the network between the node and the source corresponding to the source identifier.

In a sixth possible implementation manner of the first aspect, the method further includes: determining, according to the node and the source corresponding to the source identifier, a voice link where the node is located if the network fault occurs; and locating the network fault according to fault scores corresponding to nodes included in the voice link.

In a seventh possible implementation manner of the first aspect, the locating the network fault according to fault scores corresponding to nodes included in the voice link includes: acquiring two adjacent nodes according to the fault scores corresponding to the nodes included in the voice link, where a fault score corresponding to one node of the two adjacent nodes is greater than or equal to the preset score threshold, and a fault score corresponding to the other node is less than the preset score threshold; and determining that a location where the network fault occurs is a network segment between the two adjacent nodes.

In an eighth possible implementation manner of the first aspect, the method further includes: selecting the preset number of voice quality parameters with largest damage values from the voice quality parameters if the network fault occurs; and acquiring weight of the selected voice quality parameters.

In a ninth possible implementation manner of the first aspect, the acquiring weight of the selected voice quality parameters includes: calculating the sum of the damage values corresponding to the voice quality parameters; calculating a ratio of damage values of the selected voice quality parameters to the sum of the damage values corresponding to the voice quality parameters; and determining the calculated ratio as the weight of the selected voice quality parameters.

According to a second aspect, a method for detecting a network fault is provided, where the method includes: when a node receives a voice stream, acquiring a source identifier, a codec type, and voice quality parameters from the voice stream; acquiring, according to the codec type and the voice quality parameters, a fault score corresponding to the node; and sending the source identifier and the fault score corresponding to the node to a monitoring center, so that the monitoring center detects whether a network fault occurs on a network between the node and a source corresponding to the source identifier.

In a first possible implementation manner of the second aspect, the acquiring, according to the codec type and the voice quality parameters, a fault score corresponding to the node includes: acquiring a corresponding first baseline value according to the codec type; acquiring damage values corresponding to the voice quality parameters; and acquiring, according to the first baseline value and the damage values corresponding to the voice quality parameters, the fault score corresponding to the node.

In a second possible implementation manner of the second aspect, the acquiring a corresponding first baseline value according to the codec type includes: acquiring, according to the codec type, a corresponding bandwidth condition from a stored correspondence between the codec type and the bandwidth condition; and acquiring, according to the acquired bandwidth condition, the corresponding first baseline value from a stored correspondence between the bandwidth condition and the first baseline value.

In a third possible implementation manner of the second aspect, the acquiring damage values corresponding to the voice quality parameters includes: dividing the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; acquiring, according to the parameters of the first type and a stored correspondence between a parameter range and a damage value, the damage values corresponding to the parameters of the first type; and acquiring, according to specific values of the parameters of the second type, the damage values corresponding to the parameters of the second type.

In a fourth possible implementation manner of the second aspect, the acquiring, according to the first baseline value and the damage values corresponding to the voice quality parameters, the fault score corresponding to the node includes: calculating a sum of the damage values corresponding to the voice quality parameters; calculating a difference between the first baseline value and the sum of the damage values corresponding to the voice quality parameters, and determining the calculated difference as a second baseline value; and acquiring, according to the second baseline value and by using a mapping formula, the fault score corresponding to the node.

In a fifth possible implementation manner of the second aspect, after the acquiring damage values corresponding to the voice quality parameters, the method further includes: selecting the preset number of voice quality parameters with largest damage values from the voice quality parameters; and acquiring weight of the selected voice quality parameters, and sending the weight of the selected voice quality parameters to the monitoring center.

In a sixth possible implementation manner of the second aspect, the acquiring weight of the selected voice quality parameters includes: calculating a sum of the damage values corresponding to the voice quality parameters; calculating a ratio of damage values of the selected voice quality parameters to the sum of the damage values corresponding to the voice quality parameters; and determining the calculated ratio as the weight of the selected voice quality parameters.

According to a third aspect, a monitoring center for detecting a network fault is provided, where the monitoring center includes: a first receiving module configured to, when a node receives a voice stream, receive a source identifier, a codec type, and voice quality parameters that correspond to the voice stream and are sent by the node; a first acquiring module configured to acquire, according to the codec type and the voice quality parameters, a fault score corresponding to the node; and a first detecting module configured to detect, according to the fault score corresponding to the node, whether a network fault occurs on a network between the node and a source corresponding to the source identifier.

In a first possible implementation manner of the third aspect, the first acquiring module includes: a first acquiring unit configured to acquire a corresponding first baseline value according to the codec type; a second acquiring unit configured to acquire damage values corresponding to the voice quality parameters; and a third acquiring unit configured to acquire, according to the first baseline value and the damage values corresponding to the voice quality parameters, the fault score corresponding to the node.

In a second possible implementation manner of the third aspect, the first acquiring unit includes: a first acquiring subunit configured to acquire, according to the codec type, a corresponding bandwidth condition from a stored correspondence between the codec type and the bandwidth condition; and a second acquiring subunit configured to acquire, according to the acquired bandwidth condition, the corresponding first baseline value from a stored correspondence between the bandwidth condition and the first baseline value.

In a third possible implementation manner of the third aspect, the second acquiring unit includes: a first dividing subunit configured to divide the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; a third acquiring subunit configured to acquire, according to the parameters of the first type and a stored correspondence between a parameter range and a damage value, the damage value corresponding to the parameters of the first type; and a fourth acquiring subunit configured to acquire, according to specific values of the parameters of the second type, the damage values corresponding to the parameters of the second type.

In a fourth possible implementation manner of the third aspect, the third acquiring unit includes: a first calculating subunit configured to calculate a sum of the damage values corresponding to the voice quality parameters; a first determining subunit configured to calculate a difference between the first baseline value and the sum of the damage values corresponding to the voice quality parameters and determine the calculated difference as a second baseline value; and a fifth acquiring subunit configured to acquire, according to the second baseline value and by using a mapping formula, the fault score corresponding to the node.

In a fifth possible implementation manner of the third aspect, the first detecting module includes: a first judging unit configured to, if the fault score corresponding to the node is less than a preset score threshold, determine that no network fault occurs on the network between the node and the source corresponding to the source identifier; and a second judging unit configured to, if the fault score corresponding to the node is greater than or equal to the preset score threshold, determine that a network fault occurs on the network between the node and the source corresponding to the source identifier.

In a sixth possible implementation manner of the third aspect, the monitoring center further includes: a determining unit configured to determine, according to the node and the source corresponding to the source identifier, a voice link where the node is located if the network fault occurs; and a locating unit configured to locate the network fault according to fault scores corresponding to nodes included in the voice link.

In a seventh possible implementation manner of the third aspect, the locating unit includes: a sixth acquiring subunit configured to acquire two adjacent nodes according to the fault scores corresponding to the nodes included in the voice link, where a fault score corresponding to one node of the two adjacent nodes is greater than or equal to the preset score threshold, and a fault score corresponding to the other node is less than the preset score threshold; and a second determining subunit configured to determine that a location where the network fault occurs is a network segment between the two adjacent nodes.

In an eighth possible implementation manner of the third aspect, the monitoring center further includes: a first selecting unit configured to select the preset number of voice quality parameters with largest damage values from the voice quality parameters if the network fault occurs; and a fourth acquiring unit configured to acquire weight of the selected voice quality parameters.

In a ninth possible implementation manner of the third aspect, the fourth acquiring unit includes: a second calculating subunit configured to calculate a sum of the damage values corresponding to the voice quality parameters; a third calculating subunit configured to calculate a ratio of damage values of the selected voice quality parameters to the sum of the damage values corresponding to the voice quality parameters; and a third determining subunit configured to determine the calculated ratio as the weight of the selected voice quality parameters.

According to a fourth aspect, a node for detecting a network fault is provided, where the node includes: a second acquiring module configured to, when a node receives a voice stream, acquire a source identifier, a codec type, and voice quality parameters from the voice stream; a third acquiring module configured to acquire, according to the codec type and the voice quality parameters, a fault score corresponding to the node; and a second detecting module configured to send the source identifier and the fault score corresponding to the node to a monitoring center, so that the monitoring center detects whether a network fault occurs on a network between the node and a source corresponding to the source identifier.

In a first possible implementation manner of the fourth aspect, the third acquiring module includes: a fifth acquiring unit configured to acquire a corresponding first baseline value according to the codec type; a sixth acquiring unit configured to acquire damage values corresponding to the voice quality parameters; and a seventh acquiring unit configured to acquire, according to the first baseline value and the damage values corresponding to the voice quality parameters, the fault score corresponding to the node.

In a second possible implementation manner of the fourth aspect, the fifth acquiring unit includes: a seventh acquiring subunit configured to acquire, according to the codec type, a corresponding bandwidth condition from a stored correspondence between the codec type and the bandwidth condition; and an eighth acquiring subunit configured to acquire, according to the acquired bandwidth condition, the corresponding first baseline value from a stored correspondence between the bandwidth condition and the first baseline value.

In a third possible implementation manner of the fourth aspect, the sixth acquiring unit includes: a second dividing subunit configured to divide the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; a ninth acquiring subunit configured to acquire, according to the parameters of the first type and a stored correspondence between a parameter range and a damage value, the damage values corresponding to the parameters of the first type; and a tenth acquiring subunit configured to acquire, according to specific values of the parameters of the second type, the damage values corresponding to the parameters of the second type.

In a fourth possible implementation manner of the fourth aspect, the seventh acquiring unit includes: a fourth calculating subunit configured to calculate a sum of the damage values corresponding to the voice quality parameters; a fourth determining subunit configured to calculate a difference between the first baseline value and the sum of the damage values corresponding to the voice quality parameters and determine the calculated difference as a second baseline value; and an eleventh acquiring subunit configured to acquire, according to the second baseline value and by using a mapping formula, the fault score corresponding to the node.

In a fifth possible implementation manner of the fourth aspect, the node further includes: a second selecting unit configured to select the preset number of voice quality parameters with largest damage values from the voice quality parameters; and a first sending unit configured to acquire weight of the selected voice quality parameters and send the weight of the selected voice quality parameters to the monitoring center.

In a sixth possible implementation manner of the fourth aspect, the first sending unit includes: a fifth calculating subunit configured to calculate a sum of the damage values corresponding to the voice quality parameters; a sixth calculating subunit configured to calculate a ratio of damage values of the selected voice quality parameters to the sum of the damage values corresponding to the voice quality parameters; and a fifth determining subunit configured to determine the calculated ratio as the weight of the selected voice quality parameters.

According to a fifth aspect, a monitoring center for detecting a network fault is provided, where the monitoring center includes a first memory and a first processor and is configured to execute a method for detecting a network fault.

According to a sixth aspect, a node for detecting a network fault is provided, where the node includes a second memory and a second processor and is configured to execute a method for detecting a network fault.

In embodiments of the present invention, when a node receives a voice stream, the node acquires a source identifier, a codec type, and voice quality parameters that correspond to the voice stream; and a monitoring center acquires, according to the codec type and the voice quality parameters, a fault score corresponding to the node and detects, according to the fault score corresponding to the node, whether a network fault occurs on a network between the node and a source corresponding to the source identifier. In this way, real-time detection of the network fault is implemented, and a network fault that occurs on the network can be detected in time.

DETAILED DESCRIPTION

To make the objectives, technical solutions, and advantages of the present invention more comprehensible, the following further describes the embodiments of the present invention in detail with reference to the accompanying drawings.

Figure 1:
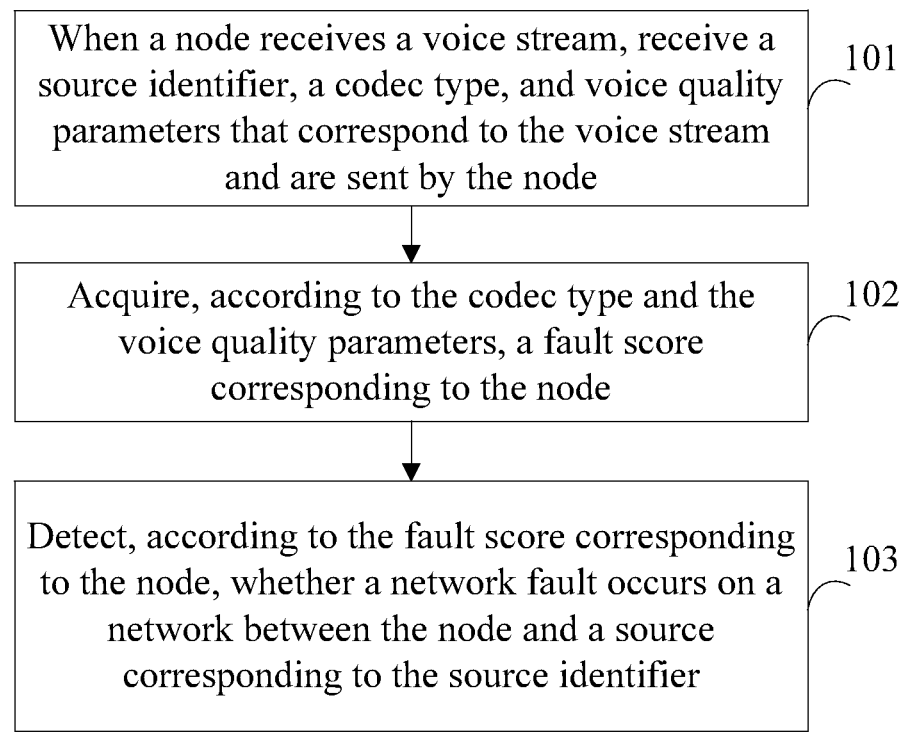
FIG. 1 is a flowchart of a method for detecting a network fault according to an embodiment of the present invention.

Referring to FIG. 1, an embodiment of the present invention provides a method for detecting a network fault, including:

Step 101: When a node receives a voice stream, receive a source identifier, a codec type, and voice quality parameters that correspond to the voice stream and are sent by the node.

Step 102: Acquire, according to the codec type and the voice quality parameters, a fault score corresponding to the node.

Step 103: Detect, according to the fault score corresponding to the node, whether a network fault occurs on a network between the node and a source corresponding to the source identifier.

In this embodiment of the present invention, when a node receives a voice stream, the node acquires a source identifier, a codec type, and voice quality parameters that correspond to the voice stream; and a monitoring center acquires, according to the codec type and the voice quality parameters, a fault score corresponding to the node and detects, according to the fault score corresponding to the node, whether a network fault occurs on a network between the node and a source corresponding to the source identifier. In this way, real-time detection of the network fault is implemented, and a network fault that occurs on the network can be detected in time.

Figure 2:
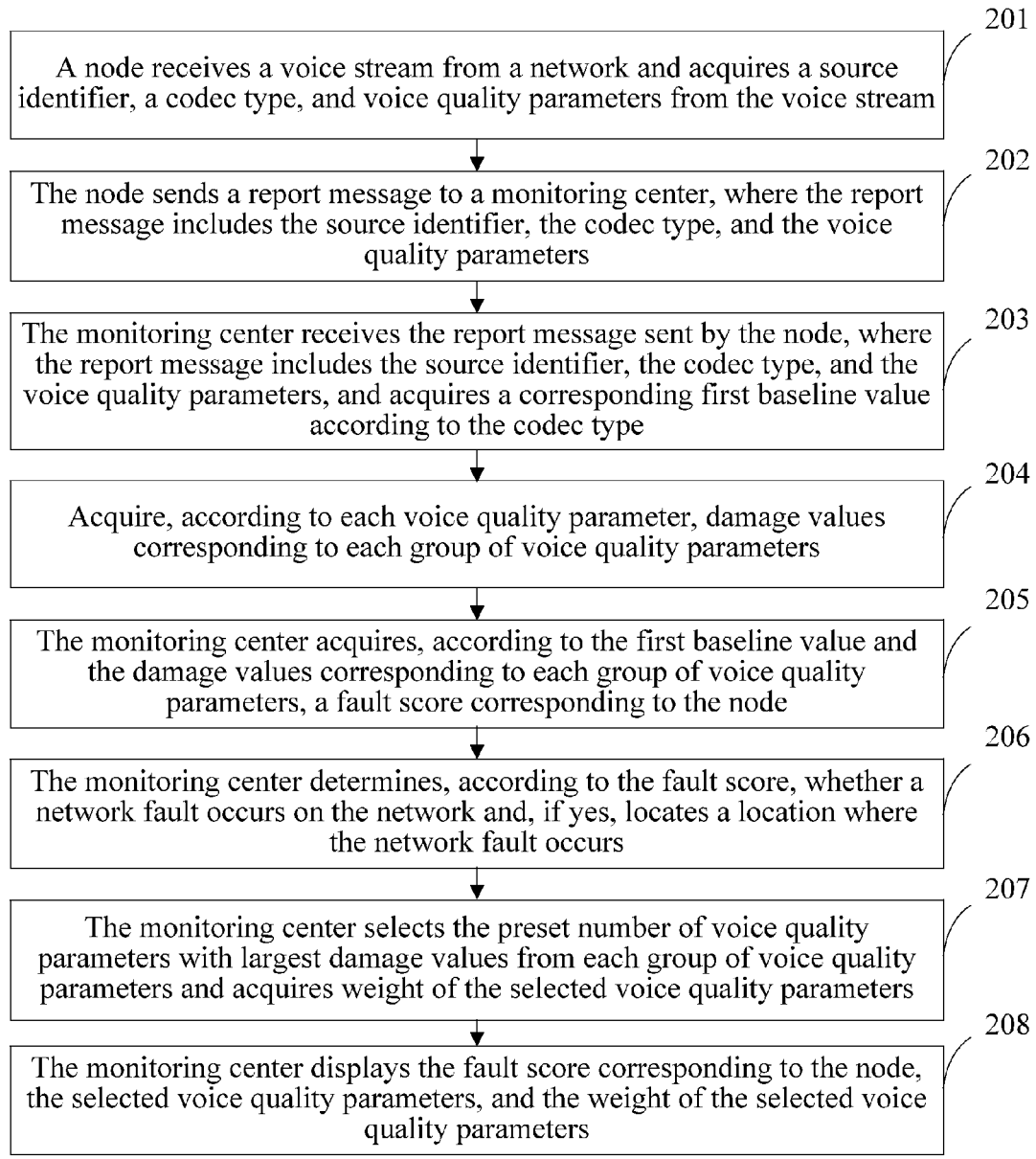
FIG. 2 is a flowchart of another method for detecting a network fault according to an embodiment of the present invention.

On the basis of the embodiment shown in FIG. 1, an embodiment of the present invention provides a method for detecting a network fault. Referring to FIG. 2, the method includes:

Step 201: A node receives a voice stream from a network and acquires a source identifier, a codec type, and voice quality parameters from the voice stream.

The voice quality parameters include a Quality of Service (QoS) parameter and a source parameter.

Specifically, the node receives the voice stream from the network and acquires the source identifier, the QoS parameter, and the source parameter from the voice stream. If the acquired QoS parameter is not a packet loss rate and/or a delay, the acquired QoS parameter is changed to a packet loss rate and/or a delay.

If the number of acquired QoS parameters is 1, it is determined whether the acquired QoS parameter is a packet loss rate or a delay, and if not, the acquired one QoS parameter is changed to a packet loss rate or a delay; if the number of acquired QoS parameters is 2, it is determined whether the two acquired QoS parameters are a packet loss rate and a delay, and if not, the two acquired QoS parameters are changed to a packet loss rate and a delay.

QoS parameters acquired by nodes on networks of different types from received voice streams may differ from each other. For example, when a node is on a wireless network, a QoS parameter acquired by the node from a received voice stream includes a frame loss rate and/or a frame error rate, and in this case, the frame loss rate and/or the frame error rate needs to be changed to a packet loss rate; when a node is on an Internet Protocol (IP) network, a QoS parameter acquired by the node from a received voice stream includes a packet loss rate, and in this case, the acquired QoS parameter does not need to be converted.

A sending node sends a voice stream to a receiving node through a voice link, where the voice link includes a sending node, one or more network nodes, and a receiving node. The node in this step may be any node that receives the voice stream in the voice link.

The QoS parameter includes at least a packet loss rate and may further include a delay. The source parameter includes at least one of the following items: a voice level, a noise level, an echo loss, an echo delay, a voice clipping ratio, a noise ratio, a one-way audio identifier, a crosstalk identifier, and an intermittence identifier. The one-way audio identifier is used to identify whether one-way audio occurs in a voice stream, the crosstalk identifier is used to identify whether crosstalk occurs in a voice stream, and the intermittence identifier is used to identify whether intermittence occurs in a voice stream.

Acquiring, by a node, a voice level and/or a noise level from a voice stream may be: acquiring burstiness of all signals included in the voice stream, selecting a voice signal whose burstiness is less than a preset first burstiness threshold from the signals included in the voice stream, acquiring the amount of energy of the voice signal, and determining the voice level according to the amount of energy of the voice signal; and/or acquiring a noise signal whose burstiness is greater than the preset first burstiness threshold and less than a preset second burstiness threshold from the signals included in the voice stream, where the preset first burstiness threshold is less than the preset second burstiness threshold, acquiring the amount of energy of the noise signal, and determining the noise level according to the amount of energy of the noise signal.

Acquiring, by a node, an echo loss and/or an echo delay from a voice stream may specifically be: receiving, by the node, a voice stream, forwarding the voice stream, and acquiring forwarding time for forwarding the voice stream; receiving, by the node, an echo signal of the voice stream, acquiring receiving time for receiving the echo signal, calculating a time difference between the receiving time and the forwarding time, and determining the calculated time difference as the echo delay; and/or comparing the voice stream with the echo signal of the voice stream to acquire the echo loss.

Acquiring, by a node, a voice clipping ratio from a voice stream may specifically be: determining clipped voice frames from voice frames included in a voice signal, counting the first number of frames of the clipped voice frames and the second number of frames of data frames included in the entire voice stream, calculating a ratio of the first number of frames to the second number of frames, and determining the calculated ratio as the voice clipping ratio.

A voice frame is formed by samples, and the samples are used to represent voice signals. A sample value of each sample is in a preset sample value range, and the value of each sample is acquired according to energy of a voice signal represented by the sample. If energy of a voice signal represented by a sample is relatively large, the largest sample value in the preset sample value range may be acquired as the value of the sample.

For any one voice frame, a sample, whose sample value is the largest sample value in the preset sample value range, is acquired from samples included in the voice frame, and the first number of acquired samples is counted. If the first number is greater than a preset threshold of the number of samples, the voice frame is determined as a clipped voice frame; if the first number is less than or equal to the preset threshold of the number of samples, it is determined that the voice frame is not a clipped voice frame.

Acquiring, by a node, a noise ratio from a voice stream may specifically be: acquiring a noise signal whose burstiness is greater than the preset second burstiness threshold from all signals included in the voice stream, counting the third number of frames of data frames included in the noise signal and the second number of frames of data frames included in the entire voice stream, calculating a ratio of the third number of frames to the second number of frames, and determining the calculated ratio as the noise ratio.

Acquiring, by a node, a one-way audio identifier from a voice stream may specifically be: monitoring, by the node, a voice link; if time during which a signal exists in only one link of bidirectional links of the voice link and no signal exists in the other link reaches a preset time, determining that one-way audio occurs in the voice stream in the voice link and setting the one-way audio identifier to indicate that one-way audio occurs in the voice stream; otherwise, determining that one-way audio does not occur in the voice stream in the voice link and setting the one-way audio identifier to indicate that one-way audio does not occur in the voice stream.

Acquiring, by a node, a crosstalk identifier from a voice stream may specifically be: determining, by the node, a received voice stream; if the voice stream is a voice stream from a same source, determining that crosstalk does not occur in the voice stream and setting the crosstalk identifier to indicate that crosstalk does not occur in the voice stream; if the voice stream is a voice stream from multiple sources, determining that crosstalk occurs in the voice stream and setting the crosstalk identifier to indicate that crosstalk occurs in the voice stream.

Acquiring, by a node, an intermittence identifier from a voice stream may specifically be: counting the number of consecutively lost packets in the voice stream, and comparing the counted number of consecutively lost packets with a preset threshold of the number of consecutively lost packets; if the counted number of consecutively lost packets is greater than the preset threshold of the number of consecutively lost packets, determining that intermittence occurs in the voice stream and setting the intermittence identifier to indicate that intermittence occurs in the voice stream; or otherwise, determining that intermittence does not occur in the voice stream and setting the intermittence identifier to indicate that intermittence does not occur in the voice stream.

Step 202: The node sends a report message to a monitoring center, where the report message includes the source identifier, the codec type, and the voice quality parameters.

Like the node, each other node that is included in the voice link and receives the voice stream may acquire the source identifier, the codec type, and the voice quality parameters and send a report message including the source identifier, the codec type, and the voice quality parameters to the monitoring center.

Step 203: The monitoring center receives the report message sent by the node, where the report message includes the source identifier, the codec type, and the voice quality parameters, and acquires a corresponding first baseline value according to the codec type.

Specifically, the report message including the source identifier, the codec type, and the voice quality parameters is received, a corresponding bandwidth condition is acquired from a stored correspondence between the codec type and the bandwidth condition according to the codec type, and the corresponding first baseline value is acquired from a stored correspondence between the bandwidth condition and the first baseline value according to the acquired bandwidth condition.

The bandwidth condition includes narrowband, broadband, and/or ultra-wideband.

Step 204: Acquire, according to each group of voice quality parameters, damage values corresponding to each group of voice quality parameters.

Specifically, each group of voice quality parameters are divided into parameters of a first type and parameters of a second type, where the parameters of the first type include a packet loss rate, a delay, a voice level, a noise level, an echo loss, an echo delay, a voice clipping ratio, and/or a noise ratio, and the parameters of the second type include a one-way audio identifier, a crosstalk identifier, and/or an intermittence identifier. The damage values corresponding to the parameters of the first type are acquired according to the parameters of the first type and a stored correspondence between a parameter range and a damage value, and the damage values corresponding to the parameters of the second type are acquired.

If the parameters of the first type include a packet loss rate, acquiring, according to the parameters of the first type and a stored correspondence between a parameter range and a damage value, the damage value corresponding to the parameters of the first type may specifically be: determining a packet loss rate range inside which the packet loss rate falls, and acquiring, according to the determined packet loss rate range, a damage value corresponding to the packet loss rate from a stored correspondence between the packet loss rate range and the damage value.

If the parameters of the first type include a delay, acquiring, according to the parameters of the first type and a stored correspondence between a parameter range and a damage value, the damage value corresponding to the parameters of the first type may specifically be: determining a delay range inside which the delay falls, and acquiring, according to the determined delay range, a damage value corresponding to the delay from a stored correspondence between the stored delay range and the damage value.

If the parameters of the first type include a voice level, acquiring, according to the parameters of the first type and a stored correspondence between a parameter range and a damage value, the damage value corresponding to the parameters of the first type may specifically be: determining a voice level range inside which the voice level falls, and acquiring, according to the determined voice level range, a damage value corresponding to the voice level from a stored correspondence between the voice level range and the damage value.

If the parameters of the first type include a noise level, acquiring, according to the parameters of the first type and a stored correspondence between a parameter range and a damage value, the damage value corresponding to the parameters of the first type may specifically be: determining a noise level range inside which the noise level falls, and acquiring, according to the determined noise level range, a damage value corresponding to the noise level from a stored correspondence between the noise level range and the damage value.

If the parameters of the first type include an echo loss, acquiring, according to the parameters of the first type and a stored correspondence between a parameter range and a damage value, the damage value corresponding to the parameters of the first type may specifically be: determining an echo loss range inside which the echo loss falls, and acquiring, according to the determined echo loss range, a damage value corresponding to the echo loss from a stored correspondence between the echo loss range and the damage value.

If the parameters of the first type include an echo delay, acquiring, according to the parameters of the first type and a stored correspondence between a parameter range and a damage value, the damage value corresponding to the parameters of the first type may specifically be: determining an echo delay range inside which the echo delay falls, and acquiring, according to the determined echo delay range, a damage value corresponding to the echo delay from a stored correspondence between the echo delay range and the damage value.

If the parameters of the first type include a voice clipping ratio, acquiring, according to the parameters of the first type and a stored correspondence between a parameter range and a damage value, the damage value corresponding to the parameters of the first type may specifically be: determining a voice clipping ratio range inside which the voice clipping ratio falls, and acquiring, according to the determined voice clipping ratio range, a damage value corresponding to the voice clipping ratio from a stored correspondence between the voice clipping ratio range and the damage value.

If the parameters of the first type include a noise ratio, acquiring, according to the parameters of the first type and a stored correspondence between a parameter range and a damage value, the damage value corresponding to the parameters of the first type may specifically be: determining a noise ratio range inside which the noise ratio falls, and acquiring, according to the determined noise ratio range, a damage value corresponding to the noise ratio from a stored correspondence between the noise ratio range and the damage value.

If the parameters of the second type include a one-way audio identifier, acquiring the damage value corresponding to the parameters of the second type may specifically be: determining, according to the one-way audio identifier, whether one-way audio occurs; if yes, setting a damage value corresponding to the one-way audio identifier to a preset first damage value; and if not, setting the damage value corresponding to the one-way audio identifier to a preset second damage value.

The preset first damage value is greater than the preset second damage value, and the preset second damage value may be a value such as 0 or 1.

If the parameters of the second type include a crosstalk identifier, acquiring the damage value corresponding to the parameters of the second type may specifically be: determining, according to the crosstalk identifier, whether crosstalk occurs; if yes, setting a damage value corresponding to the crosstalk identifier to a preset third damage value; and if not, setting the damage value corresponding to the crosstalk identifier to a preset fourth damage value.

The preset third damage value is greater than the preset fourth damage value, and the preset fourth damage value may be a value such as 0 or 1.

If the parameters of the second type include an intermittence identifier, acquiring the damage value corresponding to the parameters of the second type may specifically be: determining, according to the intermittence identifier, whether intermittence occurs; if yes, setting a damage value corresponding to the intermittence identifier to a preset fifth damage value; and if not, setting the damage value corresponding to the intermittence identifier to a preset sixth damage value.

The preset fifth damage value is greater than the preset sixth damage value, and the preset sixth damage value may be a value such as 0 or 1.

Step 205: The monitoring center acquires, according to the first baseline value and the damage values corresponding to each group of voice quality parameters, a fault score corresponding to the node.

Specifically, a sum of the damage values corresponding to each group of voice quality parameters is calculated, a difference between the first baseline value and the sum of the damage values corresponding to each group of voice quality parameters is calculated, the calculated difference is determined as a second baseline value, and the fault score corresponding to the node is acquired according to the second baseline value and by using a mapping formula.

The fault score may be a MOS score or the like.

Like the node, the monitoring center may calculate a fault score corresponding to each other node in the voice link.

Step 206: The monitoring center determines, according to the fault score, whether a network fault occurs on the network and, if yes, locates a location where the network fault occurs.

Specifically, if the fault score corresponding to the node is less than a preset score threshold, it is determined that no network fault occurs on the network; if the fault score corresponding to the node is greater than or equal to the preset score threshold, it is determined that a network fault occurs on the network, and a location where the network fault occurs is determined to be a network segment between the node and a source corresponding to the source identifier.

Locating a location where the network fault occurs may specifically be: determining, by the monitoring center according to the node and the source corresponding to the source identifier, a voice link where the node is located; acquiring, according to fault scores corresponding to nodes included in the voice link, two adjacent nodes from the nodes included in the voice link, where a fault score of one node of the two adjacent nodes is greater than or equal to the preset score threshold, and a fault score of the other node is less than the preset score threshold; and determining that the location where the network fault occurs is a network segment between the two adjacent nodes.

Further, if no network fault occurs on the network, the fault score corresponding to the node may be displayed directly.

Step 207: The monitoring center selects the preset number of voice quality parameters with largest damage values from each group of voice quality parameters and acquires weight of the selected voice quality parameters.

Specifically, the monitoring center selects the preset number of voice quality parameters with largest damage values from each group of voice quality parameters, calculates the sum of the damage values corresponding to each group of voice quality parameters, calculates a ratio of damage values of the selected voice quality parameters to the sum of the damage values corresponding to each group of voice quality parameters, and determines the calculated ratio as the weight of the selected voice quality parameters.

Step 208: The monitoring center displays the fault score corresponding to the node, the selected voice quality parameters, and the weight of the selected voice quality parameters.

In this embodiment of the present invention, when a node receives a voice stream, a source identifier, a codec type, and voice quality parameters that correspond to the voice stream and are sent by the node are received, a fault score corresponding to the node is acquired according to the codec type and the voice quality parameters, and whether a network fault occurs on a network between the node and a source corresponding to the source identifier is detected according to the fault score corresponding to the node. In this embodiment, when receiving the voice stream, the node acquires the source identifier, the codec type, and the voice quality parameters in the voice stream and sends a report message including the source identifier, the codec type, and the voice quality parameters to a monitoring center; and the monitoring center acquires, according to the codec type and the voice quality parameters, the fault score corresponding to the node and detects the network fault in the network according to the fault score corresponding to the node. In this way, real-time detection of the network fault is implemented, and a network fault that occurs on the network can be detected in time. Further, a specific network segment in which a network fault occurs can be located according to a fault score corresponding to each node in the network; in addition, the preset number of voice quality parameters with largest damage values are selected, and weight of the selected voice quality parameters is acquired. This allows a person skilled in the art to determine a cause that results in the network fault and locate a location where the network fault occurs.

Figure 3:
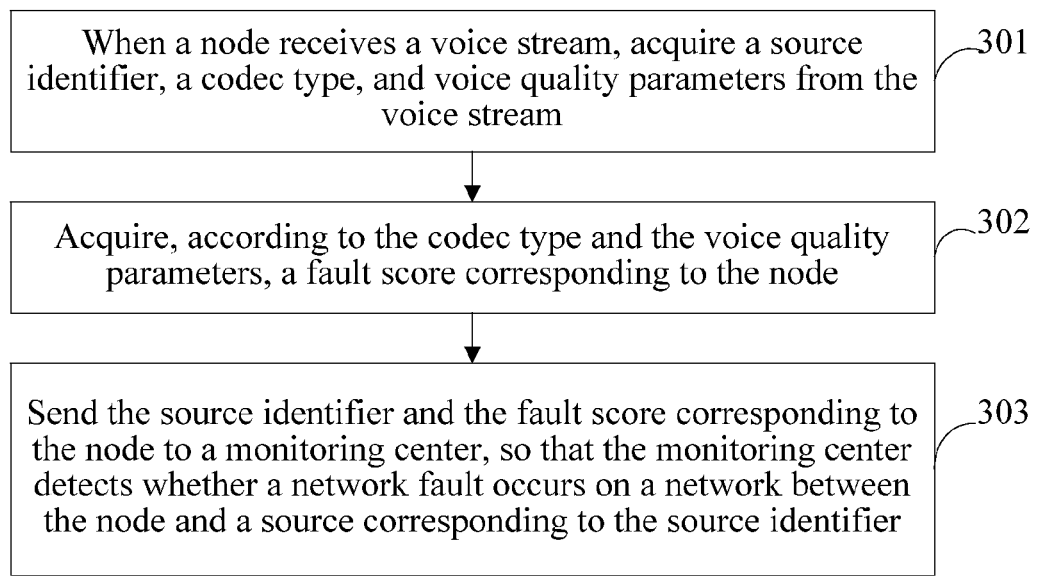
FIG. 3 is a flowchart of another method for detecting a network fault according to an embodiment of the present invention.

Referring to FIG. 3, an embodiment of the present invention provides a method for detecting a network fault, including:

Step 301: When a node receives a voice stream, acquire a source identifier, a codec type, and voice quality parameters from the voice stream.

Step 302: Acquire, according to the codec type and the voice quality parameters, a fault score corresponding to the node.

Step 303: Send the source identifier and the fault score corresponding to the node to a monitoring center, so that the monitoring center detects whether a network fault occurs on a network between the node and a source corresponding to the source identifier.

In this embodiment of the present invention, when a node receives a voice stream, the node acquires a source identifier, a codec type, and voice quality parameters that correspond to the voice stream and acquires, according to the codec type and the voice quality parameters, a fault score corresponding to the node; and a monitoring center detects, according to the fault score corresponding to the node, whether a network fault occurs on a network between the node and a source corresponding to the source identifier. In this way, real-time detection of the network fault is implemented, and a network fault that occurs on the network can be detected in time.

Figure 4:
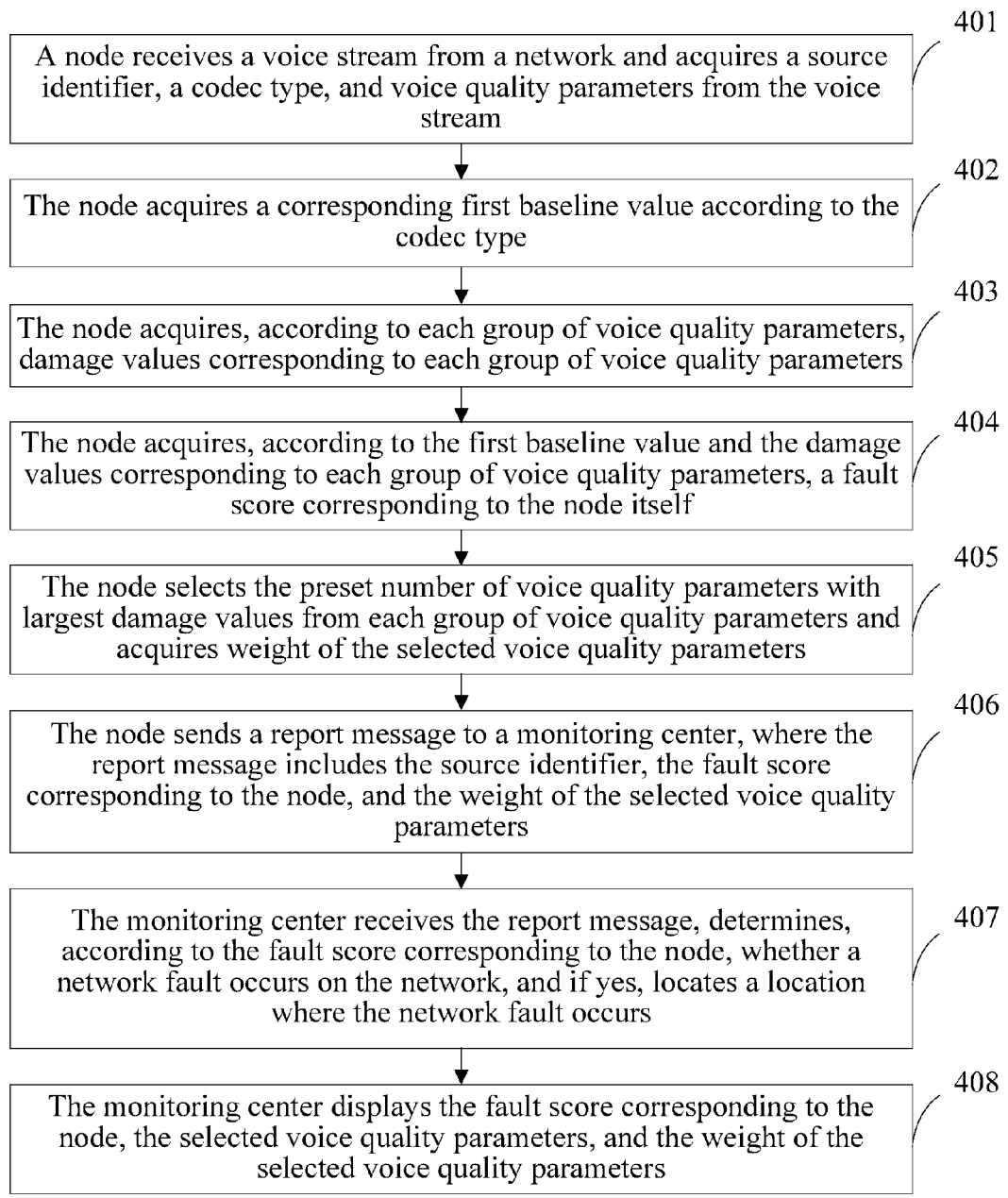
FIG. 4 is a flowchart of another method for detecting a network fault according to an embodiment of the present invention.

On the basis of the embodiment shown in FIG. 3, an embodiment of the present invention provides another method for detecting a network fault. Referring to FIG. 4, the method includes:

Step 401: A node receives a voice stream from a network and acquires a source identifier, a codec type, and voice quality parameters from the voice stream.

A specific process of acquiring, by the node, the source identifier, the codec type, and the voice quality parameters is the same as the specific process of acquiring, by the node, the source identifier, the codec type, and the voice quality parameters in step 201. Details are not described herein. For corresponding content, refer to step 201.

Step 402: The node acquires a corresponding first baseline value according to the codec type.

Specifically, a corresponding bandwidth condition is acquired from a stored correspondence between the codec type and the bandwidth condition according to the codec type, and the corresponding first baseline value is acquired from a stored correspondence between the bandwidth condition and the first baseline value according to the acquired bandwidth condition.

The bandwidth condition includes narrowband, broadband, and/or ultra-wideband.

Step 403: The node acquires, according to each group of voice quality parameters, damage values corresponding to each group of voice quality parameters.

A specific process of acquiring, by the node, the damage values corresponding to each group of voice quality parameters is the same as a specific process of acquiring, by a monitoring center, damage values corresponding to each group of voice quality parameters. Details are not described herein. For corresponding content, refer to step 204.

Step 404: The node acquires, according to the first baseline value and the damage values corresponding to each group of voice quality parameters, a fault score corresponding to the node itself.

Specifically, a sum of the damage values corresponding to each group of voice quality parameters is calculated, a difference between the first baseline value and the sum of the damage values corresponding to each group of voice quality parameters is calculated, the calculated difference is determined as a second baseline value, and the fault score corresponding to the node is acquired according to the second baseline value and by using a mapping formula.

The fault score may be a MOS score or the like.

Like the node, all nodes in a voice link may acquire their respective fault scores.

Step 405: The node selects the preset number of voice quality parameters with largest damage values from each group of voice quality parameters and acquires weight of the selected voice quality parameters.

Specifically, the node selects the preset number of voice quality parameters with largest damage values from each group of voice quality parameters, calculates the sum of the damage values corresponding to each group of voice quality parameters, calculates a ratio of damage values of the selected voice quality parameters to the sum of the damage values corresponding to each group of voice quality parameters, and determines the calculated ratio as the weight of the selected voice quality parameters.

Step 406: The node sends a report message to a monitoring center, where the report message includes the source identifier, the fault score corresponding to the node, and the weight of the selected voice quality parameters.

Like the node, each node that is included in the voice link and receives the voice stream may send a report message including the source identifier, the fault score corresponding to the node, and the weight of the selected voice quality parameters to the monitoring center.

Step 407: The monitoring center receives the report message, where the report message includes the source identifier, the fault score corresponding to the node, and the weight of the selected voice quality parameters, determines, according to the fault score corresponding to the node, whether a network fault occurs on the network, and if yes, locates a location where the network fault occurs.

A specific process of determining whether a network fault occurs on the network and locating the location where the network fault occurs is the same as the specific process of determining whether a network fault occurs on the network and locating the location where the network fault occurs in step 206. Details are not described herein. For corresponding content, please refer to step 206.

Step 408: The monitoring center displays the fault score corresponding to the node, the selected voice quality parameters, and the weight of the selected voice quality parameters.

Further, if no network fault occurs on the network, the fault score corresponding to the node may be displayed directly.

In this embodiment of the present invention, a source identifier, a codec type, and voice quality parameters are acquired from a voice stream received by a node, a fault score corresponding to the node is acquired according to the codec type and the voice quality parameters, and the source identifier and the fault score corresponding to the node are sent to a monitoring center, so that the monitoring center detects whether a network fault occurs on a network between the node and a source corresponding to the source identifier. In this embodiment, when receiving the voice stream, the node acquires the source identifier, the codec type, and the voice quality parameters in the voice stream, acquires, according to the codec type and the voice quality parameters, the fault score corresponding to the node, selected voice quality parameters, and weight of the selected voice quality parameters, and sends a report message including the fault score corresponding to the node, the selected voice quality parameters, and the weight of the selected voice quality parameters to the monitoring center; and the monitoring center detects the network fault on the network according to the fault score corresponding to the node. In this way, real-time detection of the network fault is implemented, and a network fault that occurs on the network can be detected in time. Further, a specific location where a network fault occurs can be located according to a fault score corresponding to each node on the network, and a cause that results in the network fault can be determined according to the selected voice quality parameters and the weight of the selected voice quality parameters.

Figure 5:
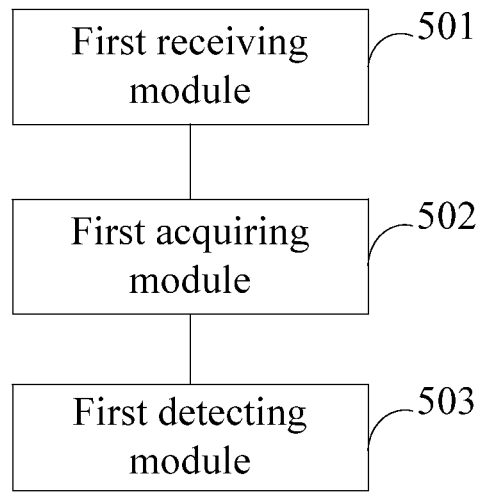
FIG. 5 is a schematic structural diagram of a monitoring center for detecting a network fault according to an embodiment of the present invention.

Referring to FIG. 5, an embodiment of the present invention provides a monitoring center for detecting a network fault, including: a first receiving module 501 configured to, when a node receives a voice stream, receive a source identifier, a codec type, and voice quality parameters that correspond to the voice stream and are sent by the node; a first acquiring module 502 configured to acquire, according to the codec type and the voice quality parameters that are received by the first receiving module 501, a fault score corresponding to the node; and a first detecting module 503 configured to detect, according to the fault score that corresponds to the node and is acquired by the first acquiring module 502, whether a network fault occurs on a network between the node and a source corresponding to the source identifier.

The first acquiring module 502 includes: a first acquiring unit configured to acquire a corresponding first baseline value according to the codec type; a second acquiring unit configured to acquire, according to the voice quality parameters, damage values corresponding to the voice quality parameters; and a third acquiring unit configured to acquire, according to the first baseline value acquired by the first acquiring unit and the damage values that correspond to the voice quality parameters and are acquired by the second acquiring unit, the fault score corresponding to the node.

The first acquiring unit includes: a first acquiring subunit configured to acquire, according to the codec type, a corresponding bandwidth condition from a stored correspondence between the codec type and the bandwidth condition; and a second acquiring subunit configured to acquire, according to the bandwidth condition acquired by the first acquiring subunit, the corresponding first baseline value from a stored correspondence between the bandwidth condition and the first baseline value.

The second acquiring unit includes: a first dividing subunit configured to divide the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; a third acquiring subunit configured to acquire, according to the parameters of the first type divided by the first dividing subunit and a stored correspondence between a parameter range and a damage value, the damage values corresponding to the parameters of the first type; and a fourth acquiring subunit configured to acquire, according to specific values of the parameters of the second type divided by a first dividing subunit, the damage values corresponding to the parameters of the second type.

The third acquiring unit includes: a first calculating subunit configured to calculate a sum of the damage values corresponding to the voice quality parameters; a first determining subunit configured to calculate a difference between the first baseline value and the sum of the damage values that is calculated by the first calculating subunit and determine the calculated difference as a second baseline value, where the damage values correspond to the voice quality parameters; and a fifth acquiring subunit configured to acquire, according to the second baseline value determined by the first determining subunit and by using a mapping formula, the fault score corresponding to the node.

The first detecting module 503 includes: a first judging unit configured to, if the fault score corresponding to the node is less than a preset score threshold, determine that no network fault occurs on the network between the node and the source corresponding to the source identifier; and a second judging unit configured to, if the first judging unit determines that the fault score corresponding to the node is greater than or equal to the preset score threshold, determine that a network fault occurs on the network between the node and the source corresponding to the source identifier.

The monitoring center further includes: a determining unit configured to determine, according to the node and the source corresponding to the source identifier, a voice link where the node is located if the network fault occurs; and a locating unit configured to locate the network fault according to fault scores corresponding to nodes included in the voice link determined by the determining unit.

Further, the locating unit includes: a sixth acquiring subunit configured to acquire two adjacent nodes according to the fault scores corresponding to the nodes included in the voice link, where a fault score corresponding to one node of the two adjacent nodes is greater than or equal to the preset score threshold, and a fault score corresponding to the other node is less than the preset score threshold; and a second determining subunit configured to determine that a location where the network fault occurs is a network segment between the two adjacent nodes acquired by the sixth acquiring subunit.

Further, the monitoring center further includes: a first selecting unit configured to select the preset number of voice quality parameters with largest damage values from the voice quality parameters if the network fault occurs; and a fourth acquiring unit configured to acquire weight of the voice quality parameters selected by the first selecting unit.

The fourth acquiring unit includes: a second calculating subunit configured to calculate the sum of the damage values corresponding to the voice quality parameters; a third calculating subunit configured to calculate a ratio of damage values of the selected voice quality parameters to the sum of the damage values that is calculated by the second calculating subunit, where the damage values correspond to the voice quality parameters; and a third determining subunit configured to determine the ratio calculated by the third calculating subunit as the weight of the selected voice quality parameters.

In this embodiment of the present invention, when a node receives a voice stream, the node acquires a source identifier, a codec type, and voice quality parameters that correspond to the voice stream; and a monitoring center acquires, according to the codec type and the voice quality parameters, a fault score corresponding to the node and detects, according to the fault score corresponding to the node, whether a network fault occurs on a network between the node and a source corresponding to the source identifier. In this way, real-time detection of the network fault is implemented, and a network fault that occurs on the network can be detected in time. Further, a specific location where a network fault occurs can be located according to a fault score corresponding to each node on the network, and a cause that results in the network fault can be determined according to selected voice quality parameters and weight of the selected voice quality parameters.

Figure 6:
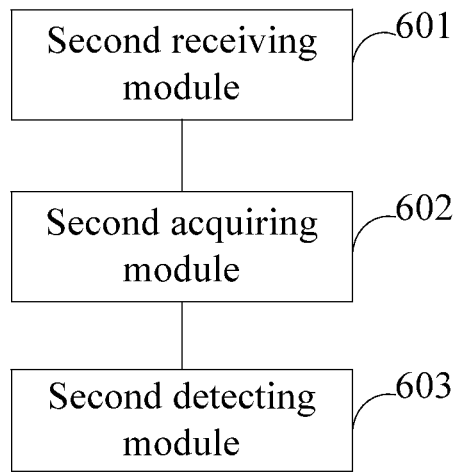
FIG. 6 is a schematic structural diagram of a node for detecting a network fault according to an embodiment of the present invention.

Referring to FIG. 6, an embodiment of the present invention provides a node for detecting a network fault, including: a second acquiring module 601 configured to, when a node receives a voice stream, acquire a source identifier, a codec type, and voice quality parameters from the voice stream; a third acquiring module 602 configured to acquire, according to the codec type and the voice quality parameters that are acquired by the second acquiring module 601, a fault score corresponding to the node; and a second detecting module 603 configured to send the source identifier and the fault score that corresponds to the node and is acquired by the third acquiring module 602 to a monitoring center, so that the monitoring center detects whether a network fault occurs on a network between the node and a source corresponding to the source identifier.

The third acquiring module 602 includes: a fifth acquiring unit configured to acquire a corresponding first baseline value according to the codec type; a sixth acquiring unit configured to acquire damage values corresponding to the voice quality parameters; and a seventh acquiring unit configured to acquire, according to the first baseline value acquired by the fifth acquiring unit and the damage values that correspond to the voice quality parameters and are acquired by the sixth acquiring unit, the fault score corresponding to the node.

The fifth acquiring unit includes: a seventh acquiring subunit configured to acquire, according to the codec type, a corresponding bandwidth condition from a stored correspondence between the codec type and the bandwidth condition; and an eighth acquiring subunit configured to acquire, according to the bandwidth condition acquired by the seventh acquiring subunit, the corresponding first baseline value from a stored correspondence between the bandwidth condition and the first baseline value.

The sixth acquiring unit includes: a second dividing subunit configured to divide the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; a ninth acquiring subunit configured to acquire, according to the parameters of the first type divided by the second dividing subunit and a stored correspondence between a parameter range and a damage value, the damage values corresponding to the parameters of the first type; and a tenth acquiring subunit configured to acquire, according to specific values of the parameters of the second type divided by the second dividing subunit, the damage values corresponding to the parameters of the second type.

The seventh acquiring unit includes: a fourth calculating subunit configured to calculate a sum of the damage values corresponding to the voice quality parameters; a fourth determining subunit configured to calculate a difference between the first baseline value and the sum of the damage values that is calculated by the fourth calculating subunit and determine the calculated difference as a second baseline value, where the damage values correspond to the voice quality parameters; and an eleventh acquiring subunit configured to acquire, according to the second baseline value determined by the fourth determining subunit and by using a mapping formula, the fault score corresponding to the node.

The node further includes: a second selecting unit configured to select the preset number of voice quality parameters with largest damage values from the voice quality parameters; and a first sending unit configured to acquire weight of the voice quality parameter selected by the second selecting unit and send the weight of the selected voice quality parameters to the monitoring center.

The first sending unit includes: a fifth calculating subunit configured to calculate the sum of the damage values corresponding to the voice quality parameters; a sixth calculating subunit configured to calculate a ratio of a damage value of the selected voice quality parameter to the sum of the damage values that is calculated by the fifth calculating subunit, where the damage values correspond to the voice quality parameters; and a fifth determining subunit configured to determine the ratio calculated by the sixth calculating subunit as the weight of the selected voice quality parameters.

In this embodiment of the present invention, a source identifier, a codec type, and voice quality parameters are acquired from a voice stream received by a node, a fault score corresponding to the node is acquired according to the codec type and the voice quality parameters, and the source identifier and the fault score corresponding to the node are sent to a monitoring center, so that the monitoring center detects whether a network fault occurs on a network between the node and a source corresponding to the source identifier. In this way, real-time detection of the network fault is implemented, and a network fault that occurs on the network can be detected in time.

Figure 7:
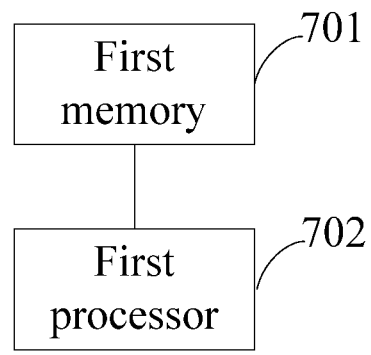
FIG. 7 is a schematic structural diagram of another monitoring center for detecting a network fault according to an embodiment of the present invention.

Referring to FIG. 7, an embodiment of the present invention provides a monitoring center for detecting a network fault, including: a first memory 701 and a first processor 702 configured to execute the following method for detecting a network fault: when a node receives a voice stream, receiving a source identifier, a codec type, and voice quality parameters that correspond to the voice stream and are sent by the node; acquiring, according to the codec type and the voice quality parameters, a fault score corresponding to the node; and detecting, according to the fault score corresponding to the node, whether a network fault occurs on a network between the node and a source corresponding to the source identifier.

The acquiring, according to the codec type and the voice quality parameters, a fault score corresponding to the node includes: acquiring a corresponding first baseline value according to the codec type; acquiring damage values corresponding to the voice quality parameters; and acquiring, according to the first baseline value and the damage values corresponding to the voice quality parameters, the fault score corresponding to the node.

The acquiring a corresponding first baseline value according to the codec type includes: acquiring, according to the codec type, a corresponding bandwidth condition from a stored correspondence between the codec type and the bandwidth condition; and acquiring, according to the acquired bandwidth condition, the corresponding first baseline value from a stored correspondence between the bandwidth condition and the first baseline value.

The acquiring damage values corresponding to the voice quality parameters includes: dividing the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; acquiring, according to the parameters of the first type and a stored correspondence between a parameter range and a damage value, the damage values corresponding to the parameters of the first type; and acquiring, according to specific values of the parameters of the second type, the damage values corresponding to the parameters of the second type.

The acquiring, according to the first baseline value and the damage values corresponding to the voice quality parameters, the fault score corresponding to the node includes: calculating a sum of the damage values corresponding to the voice quality parameters; calculating a difference between the first baseline value and the sum of the damage values corresponding to the voice quality parameters, and determining the calculated difference as a second baseline value; and acquiring, according to the second baseline value and by using a mapping formula, the fault score corresponding to the node.

The determining, according to the fault score corresponding to the node, whether a network fault occurs on a network between the node and a source corresponding to the source identifier includes: if the fault score corresponding to the node is less than a preset score threshold, determining that no network fault occurs on the network between the node and the source corresponding to the source identifier; and if the fault score corresponding to the node is greater than or equal to the preset score threshold, determining that a network fault occurs on the network between the node and the source corresponding to the source identifier.

The method further includes: determining, according to the node and the source corresponding to the source identifier, a voice link where the node is located if the network fault occurs; and locating the network fault according to fault scores corresponding to nodes included in the voice link.

The locating the network fault according to fault scores corresponding to nodes included in the voice link includes: acquiring two adjacent nodes according to the fault scores corresponding to the nodes included in the voice link, where a fault score corresponding to one node of the two adjacent nodes is greater than or equal to the preset score threshold, and a fault score corresponding to the other node is less than the preset score threshold; and determining that a location where the network fault occurs is a network segment between the two adjacent nodes.

The method further includes: selecting the preset number of voice quality parameters with largest damage values from the voice quality parameters if the network fault occurs; and acquiring weight of the selected voice quality parameters.

The acquiring weight of the selected voice quality parameters includes: calculating the sum of the damage values corresponding to the voice quality parameters; calculating a ratio of damage values of the selected voice quality parameters to the sum of the damage values corresponding to the voice quality parameters; and determining the calculated ratio as the weight of the selected voice quality parameters.

Figure 8:
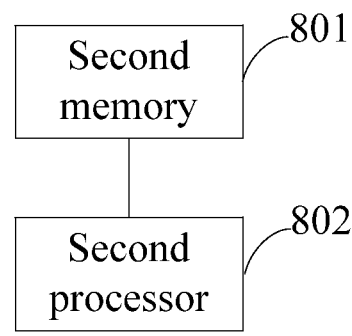
FIG. 8 is a schematic structural diagram of another node for detecting a network fault according to an embodiment of the present invention.

Referring to FIG. 8, an embodiment of the present invention provides a node for detecting a network fault, including: a second memory 801 and a second processor 802 configured to execute the following method for detecting a network fault: when a node receives a voice stream, acquiring a source identifier, a codec type, and voice quality parameters from the voice stream; acquiring, according to the codec type and the voice quality parameters, a fault score corresponding to the node; and sending the source identifier and the fault score corresponding to the node to a monitoring center, so that the monitoring center detects whether a network fault occurs on a network between the node and a source corresponding to the source identifier.

The acquiring, according to the codec type and the voice quality parameters, a fault score corresponding to the node includes: acquiring a corresponding first baseline value according to the codec type; acquiring damage values corresponding to the voice quality parameters; and acquiring, according to the first baseline value and the damage values corresponding to the voice quality parameters, the fault score corresponding to the node.

The acquiring a corresponding first baseline value according to the codec type includes: acquiring, according to the codec type, a corresponding bandwidth condition from a stored correspondence between the codec type and the bandwidth condition; and acquiring, according to the acquired bandwidth condition, the corresponding first baseline value from a stored correspondence between the bandwidth condition and the first baseline value.

The acquiring damage values corresponding to the voice quality parameters includes: dividing the voice quality parameters into parameters of a first type and parameters of a second type, where the parameters of the first type include a packet loss rate, a delay, an echo loss, an echo delay, a voice level, a noise level, a voice clipping ratio, and/or a noise ratio, and the parameters of the second type include a one-way audio identifier, a crosstalk identifier, and/or an intermittence identifier; acquiring, according to the parameters of the first type and a stored correspondence between a parameter range and a damage value, the damage values corresponding to the parameters of the first type; and acquiring, according to specific values of the parameters of the second type, the damage values corresponding to the parameters of the second type.

The acquiring, according to the first baseline value and the damage values corresponding to the voice quality parameters, the fault score corresponding to the node includes: calculating a sum of the damage values corresponding to the voice quality parameters; calculating a difference between the first baseline value and the sum of the damage values corresponding to the voice quality parameters, and determining the calculated difference as a second baseline value; and acquiring, according to the second baseline value and by using a mapping formula, the fault score corresponding to the node.

After the acquiring damage values corresponding to the voice quality parameters, the method further includes: selecting the preset number of voice quality parameters with largest damage values from the voice quality parameters; and acquiring weight of the selected voice quality parameters, and sending the weight of the selected voice quality parameters to the monitoring center.

The acquiring weight of the selected voice quality parameters includes: calculating the sum of the damage values corresponding to the voice quality parameters; calculating a ratio of damage values of the selected voice quality parameters to the sum of the damage values corresponding to the voice quality parameters; and determining the calculated ratio as the weight of the selected voice quality parameters.

A person of ordinary skill in the art may understand that all or a part of the steps of the foregoing embodiments may be implemented by hardware, or may be implemented by a program instructing relevant hardware. The program may be stored in a computer readable storage medium. The storage medium may be a read-only memory, a magnetic disk, or an optical disc.

The foregoing descriptions are merely exemplary embodiments of the present invention, but are not intended to limit the present invention. Any modification, equivalent replacement, improvement, or the like made within the spirit and principle of the present invention shall fall within the protection scope of the present invention.

What is claimed is:
1. A method for detecting a network fault, comprising:
when a node receives a voice stream, receiving a source identifier, a codec type, and voice quality parameters that correspond to the voice stream and are sent by the node;
acquiring, according to the codec type and the voice quality parameters, a fault score corresponding to the node; and
detecting according to the fault score corresponding to the node, whether a network fault occurs on a network between the node and a source corresponding to the source identifier, wherein acquiring, according to the codec type and the voice quality parameters, the fault score corresponding to the node comprises:
acquiring a corresponding first baseline value according to the codec type;
acquiring damage values corresponding to the voice quality parameters; and
acquiring, according to the first baseline value and the damage values corresponding to the voice quality parameters, the fault score corresponding to the node.

2. The method according to claim 1, wherein acquiring the corresponding first baseline value according to the codec type comprises:
acquiring, according to the codec type, a corresponding bandwidth condition from a stored correspondence between the codec type and the bandwidth condition; and
acquiring, according to the acquired bandwidth condition, the corresponding first baseline value from a stored correspondence between the bandwidth condition and the first baseline value.

3. The method according to claim 1, wherein acquiring damage values corresponding to the voice quality parameters comprises:
dividing the voice quality parameters into parameters of a first type and parameters of a second type, wherein the parameters of the first type comprise a packet loss rate, a delay, an echo loss, an echo delay, a voice level, a noise level, a voice clipping ratio, and/or a noise ratio, and wherein the parameters of the second type comprise a one-way audio identifier, a crosstalk identifier, and/or an intermittence identifier;
acquiring, according to the parameters of the first type and a stored correspondence between a parameter range and a damage value, the damage values corresponding to the parameters of the first type; and
acquiring, according to specific values of the parameters of the second type, the damage values corresponding to the parameters of the second type.

4. The method according to claim 1, wherein acquiring, according to the first baseline value and the damage values corresponding to the voice quality parameters, the fault score corresponding to the node comprises:
calculating a sum of the damage values corresponding to the voice quality parameters;
calculating a difference between the first baseline value and the sum of the damage values corresponding to the voice quality parameters;
determining the calculated difference as a second baseline value; and
acquiring, according to the second baseline value and by using a mapping formula, the fault score corresponding to the node.

5. A method for detecting a network fault, comprising:
when a node receives a voice stream, receiving a source identifier, a codec type, and voice quality parameters that correspond to the voice stream and are sent by the node;
acquiring, according to the codec type and the voice quality parameters, a fault score corresponding to the node; and
detecting, according to the fault score corresponding to the node, whether a network fault occurs on a network between the node and a source corresponding to the source identifier,
wherein detecting according to the fault score corresponding to the node, whether the network fault occurs on the network between the node and the source corresponding to the source identifier comprises:
when the fault score corresponding to the node is less than a preset score threshold, determining that no network fault occurs on the network between the node and the source corresponding to the source identifier; and
when the fault score corresponding to the node is greater than or equal to the preset score threshold, determining that a network fault occurs on the network between the node and the source corresponding to the source identifier.

6. A method for detecting a network fault, comprising:
when a node receives a voice stream, receiving a source identifier, a codec type, and voice quality parameters that correspond to the voice stream and are sent by the node;
acquiring, according to the codec type and the voice quality parameters, a fault score corresponding to the node;
detecting, according to the fault score corresponding to the node, whether a network fault occurs on a network between the node and a source corresponding to the source identifier;
determining, according to the node and the source corresponding to the source identifier, a voice link where the node is located when the network fault occurs; and
locating the network fault according to fault scores corresponding to nodes comprised in the voice link,
wherein locating the network fault according to the fault scores corresponding to the nodes comprised in the voice link comprises:
acquiring two adjacent nodes according to the fault scores corresponding to the nodes comprised in the voice link, wherein a fault score corresponding to one node of the two adjacent nodes is greater than or equal to a preset score threshold, and wherein a fault score corresponding to the other node is less than the preset score threshold; and
determining that a location where the network fault occurs is a network segment between the two adjacent nodes.

7. The method according to claim 1, further comprising:
selecting the preset number of voice quality parameters with largest damage values from the voice quality parameters when the network fault occurs; and
acquiring weight of the selected voice quality parameters.

8. The method according to claim 7, wherein acquiring the weight of the selected voice quality parameters comprises:
calculating a sum of damage values corresponding to the voice quality parameters;
calculating a ratio of damage values of the selected voice quality parameters to the sum of the damage values corresponding to the voice quality parameters; and
determining the calculated ratio as the weight of the selected voice quality parameters.

9. A method for detecting a network fault, comprising:
when a node receives a voice stream, acquiring a source identifier, a codec type, and voice quality parameters from the voice stream;
acquiring, according to the codec type and the voice quality parameter, a fault score corresponding to the node; and
sending the source identifier and the fault score corresponding to the node to a monitoring center such that the monitoring center detects whether a network fault occurs on a network between the node and a source corresponding to the source identifier,
wherein acquiring, according to the codec type and the voice quality parameters, the fault score corresponding to the node comprises:
acquiring a corresponding first baseline value according to the codec type;
acquiring damage values corresponding to the voice quality parameters; and
acquiring, according to the first baseline value and the damage values corresponding to the voice quality parameters, the fault score corresponding to the node.

10. The method according to claim 9, wherein acquiring the corresponding first baseline value according to the codec type comprises:
acquiring, according to the codec type, a corresponding bandwidth condition from a stored correspondence between the codec type and the bandwidth condition; and
acquiring, according to the acquired bandwidth condition, the corresponding first baseline value from a stored correspondence between the bandwidth condition and the first baseline value.

11. The method according to claim 9, wherein acquiring the damage values corresponding to the voice quality parameters comprises:
dividing the voice quality parameters into parameters of a first type and parameters of a second type, wherein the parameters of the first type comprise a packet loss rate, a delay, an echo loss, an echo delay, a voice level, a noise level, a voice clipping ratio, and/or a noise ratio, and wherein the parameters of the second type comprise a one-way audio identifier, a crosstalk identifier, and/or an intermittence identifier;
acquiring, according to the parameters of the first type and a correspondence between a stored parameter range and a damage value, the damage values corresponding to the parameters of the first type; and
acquiring, according to specific values of the parameters of the second type, the damage values corresponding to the parameters of the second type.

12. The method according to claim 9, wherein acquiring, according to the first baseline value and the damage values corresponding to the voice quality parameters, the fault score corresponding to the node comprises:
calculating a sum of the damage values corresponding to the voice quality parameters;
calculating a difference between the first baseline value and the sum of the damage values corresponding to the voice quality parameters;
determining the calculated difference as a second baseline value; and
acquiring, according to the second baseline value and by using a mapping formula, the fault score corresponding to the node.

13. The method according to claim 9, wherein after acquiring the damage values corresponding to the voice quality parameters, the method further comprises:
selecting the preset number of voice quality parameters with largest damage values from the voice quality parameters;
acquiring weight of the selected voice quality parameters; and
sending the weight of the selected voice quality parameters to the monitoring center.

14. The method according to claim 13, wherein acquiring the weight of the selected voice quality parameters comprises:

calculating a sum of the damage values corresponding to the voice quality parameters;
calculating a ratio of damage values of the selected voice quality parameters to the sum of the damage values corresponding to the voice quality parameters; and
determining the calculated ratio as the weight of the selected voice quality parameters.

15. A monitoring center for detecting a network fault, comprising:
a computer processor configured to:
when a node receives a voice stream, receive a source identifier, a codec type, and voice quality parameters that correspond to the voice stream and are sent by the node;
acquire, according to the codec type and the voice quality parameters, a fault score corresponding to the node;
detect, according to the fault score that corresponds to the node, whether a network fault occurs on a network between the node and a source corresponding to the source identifier;
acquire a corresponding first baseline value according to the codec type;
acquire damage values corresponding to the voice quality parameters; and
acquire, according to the first baseline value and the damage values that correspond to the voice quality parameters, the fault score corresponding to the node.

16. The monitoring center according to claim 15, wherein the computer processor is configured to:
acquire, according to the codec type, a corresponding bandwidth condition from a stored correspondence between the codec type and the bandwidth condition; and
acquire, according to the bandwidth condition, the corresponding first baseline value from a stored correspondence between the bandwidth condition and the first baseline value.

17. The monitoring center according to claim 15, wherein the computer processor is configured to:
divide the voice quality parameters into parameters of a first type and parameters of a second type, wherein the parameters of the first type comprise a packet loss rate, a delay, an echo loss, an echo delay, a voice level, a noise level, a voice clipping ratio, and/or a noise ratio, and wherein the parameters of the second type comprise a one-way audio identifier, a crosstalk identifier, and/or an intermittence identifier;
acquire, according to the parameters of the first type and a stored correspondence between the parameter range and a damage value, the damage values corresponding to the parameters of the first type; and
acquire, according to specific values of the parameters of the second type, the damage values corresponding to the parameters of the second type.

18. The monitoring center according to claim 15, wherein the computer processor is configured to:
calculate a sum of the damage values corresponding to the voice quality parameters;
calculate a difference between the first baseline value and the sum of the damage values that is calculated and determine the calculated difference as a second baseline value, wherein the damage values correspond to the voice quality parameters; and
acquire, according to the second baseline value and by using a mapping formula, the fault score corresponding to the node.

19. A monitoring center for detecting a network fault, comprising:
a computer processor configured to:
when a node receives a voice stream, receive a source identifier, a codec type, and voice quality parameters that correspond to the voice stream and are sent by the node;
acquire, according to the codec type and the voice quality parameters, a fault score corresponding to the node;
detect, according to the fault score that corresponds to the node, whether a network fault occurs on a network between the node and a source corresponding to the source identifier;
when the fault score corresponding to the node is less than a preset score threshold, determine that no network fault occurs on the network between the node and the source corresponding to the source identifier; and
when the fault score corresponding to the node is greater than or equal to the preset score threshold, determine that a network fault occurs on the network between the node and the source corresponding to the source identifier.

20. A monitoring center for detecting a network fault, comprising:
a computer processor configured to:
when a node receives a voice stream, receive a source identifier, a codec type, and voice quality parameters that correspond to the voice stream and are sent by the node;
acquire, according to the codec type and the voice quality parameters, a fault score corresponding to the node;
detect, according to the fault score that corresponds to the node, whether a network fault occurs on a network between the node and a source corresponding to the source identifier;
determine, according to the node and the source corresponding to the source identifier, a voice link where the node is located when the network fault occurs;
locate the network fault according to fault scores corresponding to nodes comprised in the voice link;
acquire two adjacent nodes according to the fault scores corresponding to the nodes comprised in the voice link, wherein a fault score corresponding to one node of the two adjacent nodes is greater than or equal to the preset score threshold, and wherein a fault score corresponding to the other node is less than the preset score threshold; and
determine that a location where the network fault occurs is a network segment between the two adjacent nodes.

21. The monitoring center according to claim 15, wherein the computer processor is configured to:
select the preset number of voice quality parameters with largest damage values from the voice quality parameters when the network fault occurs; and
acquire weight of the voice quality parameter selected by the first selecting unit.

22. The monitoring center according to claim 21, wherein the computer processor is configured to:
calculate a sum of the damage values corresponding to the voice quality parameters;
calculate a ratio of damage values of the selected voice quality parameters to the sum of the damage values, wherein the damage values correspond to the voice quality parameters; and determine the ratio calculated as the weight of the selected voice quality parameters.

23. A node for detecting a network fault, comprising:
a computer processor configured to:
    when a node receives a voice stream, acquire a source identifier, a codec type, and voice quality parameters from the voice stream;
    acquire, according to the codec type and the voice quality parameters, a fault score corresponding to the node;
    send the source identifier and the fault score that correspond to the node to a monitoring center such that the monitoring center detects whether a network fault occurs on a network between the node and a source corresponding to the source identifier;
    acquire a corresponding first baseline value according to the codec type;
    acquire damage values corresponding to the voice quality parameters; and
    acquire, according to the first baseline value and the damage values that correspond to the voice quality parameters, the fault score corresponding to the node.

24. The node according to claim 23, wherein the computer processor is configured to:
    acquire, according to the codec type, a corresponding bandwidth condition from a stored correspondence between the codec type and the bandwidth condition; and
    acquire, according to the bandwidth condition, the corresponding first baseline value from a stored correspondence between the bandwidth condition and the first baseline value.

25. The node according to claim 23, wherein the computer processor is configured to:
    divide the voice quality parameters into parameters of a first type and parameters of a second type, wherein the parameters of the first type comprise a packet loss rate, a delay, an echo loss, an echo delay, a voice level, a noise level, a voice clipping ratio, and/or a noise ratio, and wherein the parameters of the second type comprise a one-way audio identifier, a crosstalk identifier, and/or an intermittence identifier;
    acquire, according to the parameters of the first type and a stored correspondence between a parameter range and a damage value, the damage values corresponding to the parameters of the first type; and
    acquire, according to specific values of the parameters of the second type, the damage values corresponding to the parameters of the second type.

26. The node according to claim 23, wherein the computer processor is configured to:
    calculate a sum of the damage values corresponding to the voice quality parameters;
    calculate a difference between the first baseline value and the sum of the damage values and determine the calculated difference as a second baseline value, wherein the damage values correspond to the voice quality parameters; and
    acquire, according to the second baseline value and by using a mapping formula, the fault score corresponding to the node.

27. The node according to claim 23, wherein the computer processor is configured to:
    select the preset number of voice quality parameters with largest damage values from the voice quality parameters; and
    acquire weight of the voice quality parameters and send the weight of the selected voice quality parameters to the monitoring center.

28. The node according to claim 27, wherein the computer processor is configured to:
    calculate the sum of the damage values corresponding to the voice quality parameters;
    calculate a ratio of damage values of the selected voice quality parameters to the sum of the damage values, wherein the damage values correspond to the voice quality parameters; and
    determine the ratio as the weight of the selected voice quality parameters.

* * * * *